United States Patent [19]

Hirose et al.

[11] Patent Number: 4,819,157

[45] Date of Patent: Apr. 4, 1989

[54] OVERCURRENT PROTECTION CIRCUIT FOR INVERTER DEVICE INCLUDING MAJORITY CIRCUIT FOR TURN-OFF OF MAJORITY OF CONDUCTING TRANSISTORS

[75] Inventors: Kenji Hirose; Eiichi Sugishima; Masakatsu Daijyo, all of Nagoya, Japan

[73] Assignee: Mitsubishi Denki Kabushiki Kaisha, Tokyo, Japan

[21] Appl. No.: 103,639

[22] Filed: Oct. 2, 1987

[30] Foreign Application Priority Data

Oct. 2, 1986 [JP] Japan ................... 61-235012
Jun. 30, 1987 [JP] Japan ................... 62-163295

[51] Int. Cl.$^4$ .................... H02P 7/122; H02M 7/5387
[52] U.S. Cl. .................................. 363/56; 363/98
[58] Field of Search .............. 363/56, 80, 98, 58; 361/31

[56] References Cited

U.S. PATENT DOCUMENTS

| | | | |
|---|---|---|---|
| 4,672,524 | 6/1987 | Toriyama et al. | 363/56 |
| 4,672,525 | 6/1987 | Horie | 363/58 |
| 4,675,799 | 6/1987 | Suzuki et al. | 363/58 |

FOREIGN PATENT DOCUMENTS

| | | | |
|---|---|---|---|
| 10979 | 5/1980 | European Pat. Off. | 363/56 |
| 10980 | 5/1980 | European Pat. Off. | 363/56 |
| 161027 | 12/1979 | Japan | 363/56 |
| 161026 | 12/1979 | Japan | 363/56 |
| 629628 | 4/1982 | Switzerland | 363/56 |

Primary Examiner—William H. Beha, Jr.
Attorney, Agent, or Firm—Sughrue, Mion, Zinn, Macpeak & Seas

[57] ABSTRACT

An overcurrent protection circuit for an inverter device including three arms each composed of a pair of series connected electric gates, a junction therebetween being connected to a load and opposite ends being connected across a d.c. power source, and adapted to supply a three-phase a.c. power to the load by on-off controlling the electric gates sequentially according to on-off signals of the electric gates supplied from a control circuit. Majority logic circuitry is provided, and stress conditions in the electric gates which receive substantially a stress produced when the electric gates are turned off are detected in order to release these gates from a large stress exerted on the gates when an output short-circuit occurs. The majority logic circuitry control the sequence of turning off the electric gates so that the stress on the detected gate is reduced, to protect the gates from damage due to excess stress on the gates when the output short-circuit occurs.

8 Claims, 12 Drawing Sheets

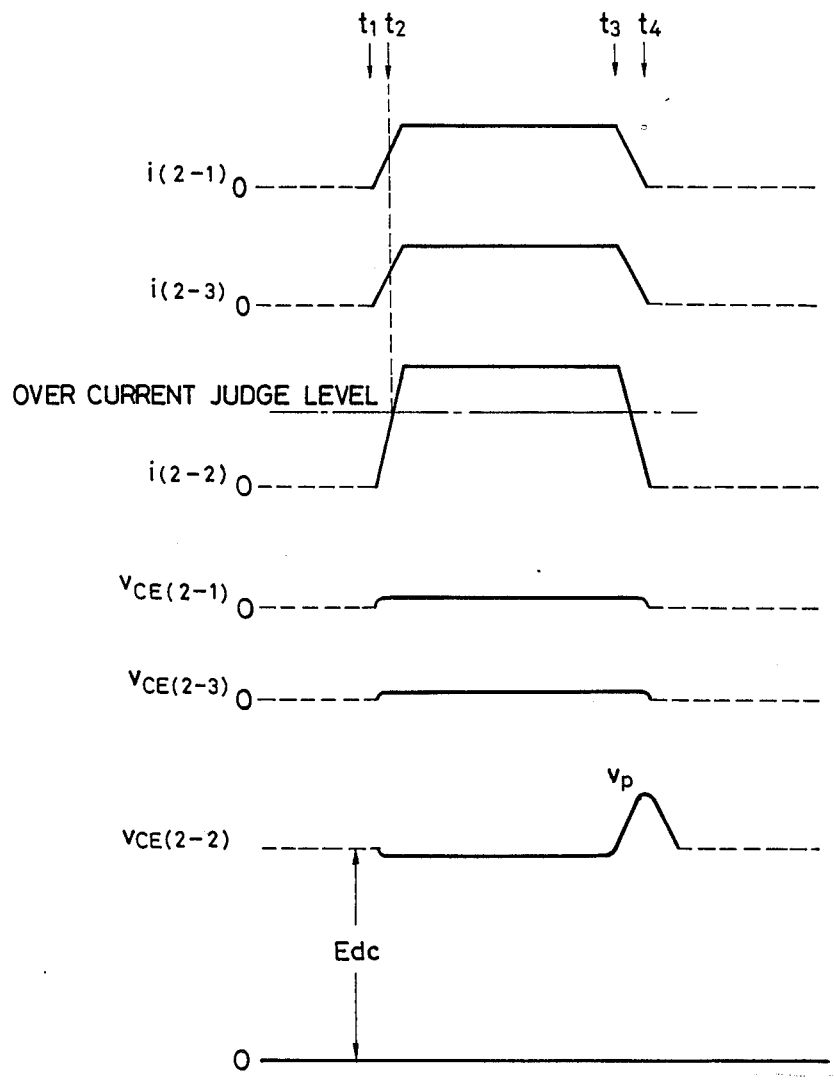

OVERCURRENT PROTECTION CIRCUIT FOR INVERTER DEVICE INCLUDING MAJORITY CIRCUIT FOR TURN-OFF OF MAJORITY OF CONDUCTING TRANSISTORS

BACKGROUND OF THE INVENTION

The present invention relates to an overcurrent protection circuit for an inverter device for preventing an electric valve used in an inverter portion of the inverter device from being damaged by an overcurrent in an event of output short-circuit etc.

FIG. 1 is a circuit diagram of an overcurrent protection circuit of an inverter device used in a conventional inverter of general voltage type and an associated peripheral circuit device. In FIG. 1, a reference numeral 1 depicts a d.c. power source, 2—1 a transistor connected in series to a transistor 2—4, an intermedial point U therebetween being connected to a load 5 and opposite ends of the series connection being connected across the d.c. power source 1, 2—3 a transistor connected in series with a transistor 2—6, an intermedial point V being connected to the load 5 and opposite ends of the series connection being connected across the d.c. power source 1, 2—5 a transistor connected in series with a transistor 2—2, an intermedial point W therebetween being connected to the load 5 and opposite ends of the series connection being connected across the d.c power source 1, 3—1 a diode connected in parallel to the transistor 2—1 such that its conducting direction is opposite to that of the transistor 2—1, 3—2 a diode connected in parallel to the transistor 2—2 in the opposite direction similarly to the diode 3—1, 3—3 a diode connected similarly to the transistor 2—3, 3—4 a diode connected similarly to the transistor 2—4, 3—5 a diode connected similarly to the transistor 2—5, 3—6 a diode connected similarly to the transistor 2—6, 4—1 a current detector inserted between the intermedial point U and the load 5, 4—2 a current detector connected between the intermedial point V and the load 5, 4—3 a current detector connected between the intermedial point W and the load 5, 8 a major priority circuit responsive to outputs of the current detectors 4—1, 4—2 and 4—3 for outputting the largest one of the detector outputs by a comparison of absolute values of them, 9 an overcurrent judging circuit for judging an overcurrent according to an output of the major priority circuit 8, 10 a cut-off signal corresponding to the output of the overcurrent judging circuit 9, 7 a cut-off circuit responsive to an output of a short-circuit preventing circuit 11 and the cut-off signal 10 for outputting a signal to be supplied to bases of the transistor 2—1, 2—2, 2—3, 2—4, 2—5 and 2—6, and 6 a base signal generator, an output of which is an input of the short-circuit preventing circuit 11.

In operation, when an output frequency of the inverter is set by a frequency setting means which is not shown and the output frequency is supplied to the base signal generator 6 as a frequency instruction signal, the base signal generator 6 produces control signals to be supplied to respective transistor of the so-called 180 degree conduction type shown in FIG. 2. Since there is a transistor switching delay, upper and lower transistors of each arm, e.g., the transistors 2—1 and 2—4, 2—3 and 2—6 or 2—5 and 2—2, may be turned on simultaneously. In order to prevent such short-circuit condition from occurring, a dead time td is provided in base signals, i.e., ignition signals, of the upper and lower transistors by passing the output of the base signal generator 6 through the short-circuit preventing circuit 11. FIG. 3 is a circuit diagram of one of six circuit portions constituting the short-circuit preventing circuit 11. Although a detailed description of the short-circuit preventing circuit operation is omitted because it is a mere delay timer, it receives the transistor control signals such as shown in FIG. 2 from the base signal generator 6, delays them by a time determined by a time constant of a resistor R and a capacitor C to delay leading edges by the dead time td and supplies them as transistor base signals having waveforms such as shown in FIG. 4 to the cut off circuit 7. Incidentally, capitals D and B in FIG. 3 depict a diode and a buffer, respectively. When the cut-off circuit 7 has no cut-off signal 10, it operates to supply the transistor base signals from the short-circuit preventing circuit 11 to the respective transistors 2—1 to 2—6 upon which these transistors perform switching operations to supply a.c. power to the load 5. In this case, the diodes 3—1 to 3—6 act as circulating diodes for processing reactive energy of the load 5.

As to an operation of the overcurrent protection circuit, the current detectors 4—1, 4—2 and 4—3 detect currents in U, V and W phases, respectively, convert them into voltage signals and supplies them to the major priority circuit 8 which compares absolute values of the voltage signals with each other and provides a voltage signal having the maximum value as its output. This operation is shown in FIG. 5. The overcurrent judging circuit 9 responds to the output of the major priority circuit and supplies the cut-off signal 10 to the cut-off circuit 7 when the load is increased for some reason and the current is increased thereby. The cut-off circuit 7 responds to the cut-off signals 10 to cut-off the base signals to the transistors 2—1 to 2—6 to thereby prevent the power supply to the load 5. Thus, all of the transistors are protected against damage due to overcurrent.

Among operations of the overcurrent protection circuit, a protection of output short-circuit which provides the stress to the transistors will be described. The term "output short circuit" used here means a state where at least two of the three phases U, V and W are short-circuited simultaneously. Assuming that all of the three phases U, V and W are short-circuited simultaneously, ignition signals to be supplied to the respective transistor 2—1 to 2—6 can be classified into six modes as shown in Table 1 below where the dead time period td and the switching times of the transistor are neglected.

TABLE 1

| phase transistor | upper transistor | | | lower transistor | | |
|---|---|---|---|---|---|---|
| | U 2-1 | V 2-3 | W 2-5 | U 2-4 | V 2-6 | W 2-2 |
| mode 1 | 0 | 0 | 1 | 1 | 1 | 0 |
| mode 2 | 0 | 1 | 0 | 1 | 0 | 1 |
| mode 3 | 0 | 1 | 1 | 1 | 0 | 0 |
| mode 4 | 1 | 0 | 0 | 0 | 1 | 1 |
| mode 5 | 1 | 0 | 1 | 0 | 1 | 0 |
| mode 6 | 1 | 1 | 0 | 0 | 0 | 1 |

In Table 1, "1" signifies an on state of a transistor and "0" signifies an off state of a transistor. From Table 1, it is clear that the transistors are in the following two conditions.

1. two upper transistors are on. (two phases) one lower transistor is on. (one phase)
2. one upper transistor is on. (one phase) two lower transistors are on. (two phases)

Since the above two conditions are relative to each other, mode 6 of the condition 1, i.e, the output phases U, V and W are short-circuited when the transistors 2—1, 2—3 and 2—2 are in on state will be considered as a typical example.

This condition is shown in FIG. 6, and collector currents and collector-emitter voltages of the respective transistors when short-circuited are shown in FIG. 7. In FIG. 7, when a short-circuit occurs at a time t1, collector currents of the respective transistors increase abruptly due to reduction of output impedances thereof. The collector current i(2—2) of the transistor 2—2 is increased up to a value determined by the base current and the specific current amplification factor hFE thereof and clamped thereat. On the other hand, when it is assumed that electric characteristics of the respective transistors are substantially the same, currents flowing through the respective transistors 2—1 and 2—3 become as follows according to Kirchhoff's law.

$$i(2-1) = i(2-3) = \tfrac{1}{2} i(2-2)$$

Therefore and since collector current-collector emitter voltage characteristics ic-VcE are non-linear, the transistor 2—2 whose collector-emitter current is the largest owes substantial portion of the voltage while the transistors 2—1 and 2—3 owe small portions thereof as shown in FIG. 7. In other words, the transistor 2—2 is operating in a more active region than those of the transistors 2—1 and 2—3 and, therefore, it is operating under a severe stress condition.

As shown, the current i(2—2), i.e., W phase current, exceeds an overcurrent judging level at the time t2. However, the cut-off operation is started at a time t3 due to response delays of the current detector 4—3, the major priority circuit 8, the overcurrent judging circuit 9 and the cut-off circuit 7 etc., a response delay of base drive circuits which are not shown and response delay of transistors due to storage times thereof etc. Therefore, the transistors to be used should not be damaged even if they are subjected to such currents and voltages for such responsive delay times during short-circuit conditions.

At the time instance t3, the current cut-off operation is started. Since the transistor 2—2 is in the deepest active region as mentioned previously, its storage time is the shortest among others and thus the cut-off operation is started at the highest speed. Therefore, collector currents i(2—1) and i(2—3) of the transistor 2—1 and 2—3 are reduced nominally due to the cut-off operation for the transistor 2—2 at the time t3. The collector current of the transistor 2—2 is then reduced to 0 during a falling time from the time t3 to a time t4 at a current damping rate di/dt and the cut-off is completed at which a spike voltage $vP = L\, di/dt$, where L is a wiring inductance, appears in the collector-emitter voltage vCE(2—2) of the transistor 2—2 causing the latter to be severely stressed. In order to restrict this within a reverse bias safety operation area (RBSOA) thereof, snubber circuit is used or transistors having large RBSOA are selected.

As mentioned hereinbefore, the transistor which is turned on by itself is subjected to the heaviest stress during the short-circuit condition.

SUMMARY OF THE INVENTION

In the conventional overcurrent protection circuit for inverter device constructed as mentioned above, the stress of the transistor which is turned on by itself for the time period from t1 to t3 during the output short-circuit condition can be made smaller by improving response delays of the current detector, the major priority circuit, the overcurrent protection circuit and the cut-off circuit etc. However, the stress to which the transistor which is turned on by itself for the turn-off time from t3 to t4 is subjected is due to the wiring inductance. Therefore, in order to make this stress smaller, it is necessary to reduce the wiring inductance or to restrict the spike voltage by using the snubber circuit. However, such approaches usually require special constructive consideration and/or large structure which are not acceptable in recent tendency toward compact design of electric circuit device. Therefore, it is unavoidable to use transistors which have large RBSOA and are very expensive.

An object of the present invention is to provide an overcurrent protection circuit for an inverter which is capable of remarkably reducing the stress exerted on a transistor which is turned on by itself when other transistors are turned off on an occurrence of output short-circuit and protecting the transistors without the use of a large size snubber circuit and/or expensive transistors.

Another object of the present invention is to provide an overcurrent protection circuit for an inverter device, which comprises a majority circuit responsive to on-off signals of gates for providing an output in response to a majority of on signals of upper gates of three arms and on signals of lower gates of the three arms and in which, during an overcurrent protecting operation, the on signals of the gates which are judged as majority are assigned as off signal and, at a certain time thereafter, the on signals of the gates which are judged as minority are assigned as off signal.

A further object of the present invention is to provide an overcurrent protection circuit for an inverter device which comprises a majority circuit responsive to on-off signals of gates for providing an output in response to a majority of on signals of upper gates of three arms and on signals of lower gates of the arms and in which, during an overcurrent protecting operation, one of the on signals of the gates which are judged as majority is assigned as an off signal and, at a certain time thereafter, the remaining on signals are assigned as off signals.

In the present invention, a gate which is substantially subjected to a stress in turning gates so they they are released from an excess stress exerted on them during an output short-circuit is detected and a sequence of turning the gates off is controlled such that the stress on the gate is reduced, thereby preventing damages of these gates due to excessive stresses exerted thereon.

BRIEF DESCRIPTION OF THE DRAWINGS

FIG. 7 shows collector currents and collector-emitter voltages of the respective transistors during the output short-circuit in the mode 6;

DETAILED DESCRIPTION OF THE PREFERRED EMBODIMENTS

Figure 8:
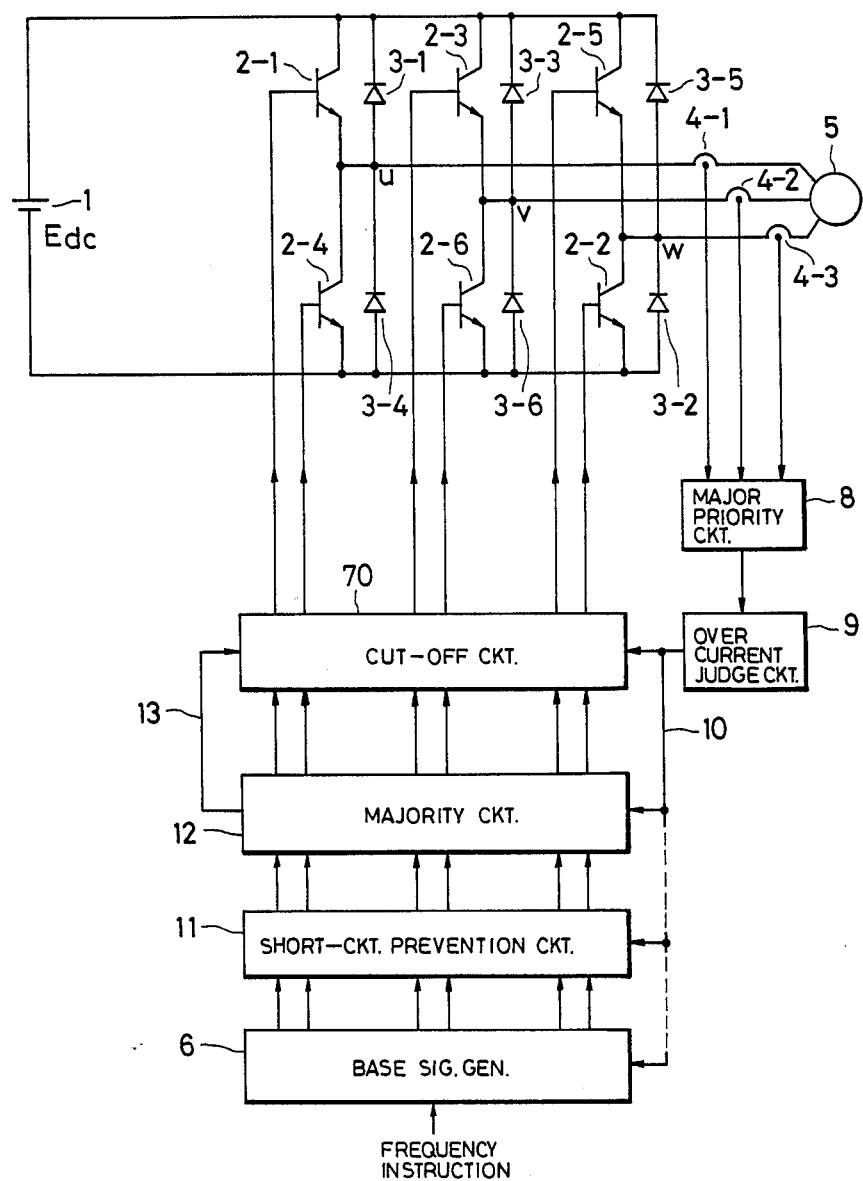
FIG. 8 is a circuit diagram of an inverter and its overcurrent protection circuit according to an embodiment of the present invention.

In FIG. 8 which shows a first embodiment of the present invention, reference numeral 1 depicts a d.c. power source, 2—1 a transistor connected in series with a transistor 2—4, a junction U being connected to a load 5, 2—3 a transistor connected in series with a transistor 2—6, a junction V being connected to the load 5 and opposite ends being connected across the d.c. power source 1, 2—5 a transistor connected in series with a transistor 2—2, a junction W being connected to the load 5 and opposite ends being connected across the d.c. power source 1, 3—1 a diode connected in parallel to the transistor 2—1 oppositely in direction, 3—2 a diode connected in parallel to the transistor 2—2 oppositely in direction, 3—3 a diode connected in parallel to the transistor 2—3 oppositely in direction, 3—4 a diode connected in parallel to the transistor 2—4 oppositely in direction, 3—5 a diode connected in parallel to the transistor 2—5 oppositely in direction, 3—6 a diode connected in parallel to the transistor 2—6 oppositely in direction, 4—1 a current detector connected between the junction U between the transistors 2—1 and 2—4 and the load 5, 4—2 a current detector connected between the junction V between the 2—3 and 2—6 and the load 5, 4—3 a current detector connected between the junction W between the transistors 2—5 and 2—2 and the load 5, 8 a major priority circuit responsive to outputs of the current detectors 4—1, 4—2 and 4—3 for comparing absolute values of them with each other and outputting the largest one of them as an output, 9 an overcurrent judging circuit responsive to the output of the major priority circuit to judge an overcurrent condition, 10 a cut-off signal corresponding to a judge output of the overcurrent judging circuit 9, 6 a base signal generator for supplying an input to a short-circuit preventing circuit 11, 12 a majority circuit responsive to an output of the short-circuit preventing circuit 11 and the cut-off signal 10, 13 a majority signal which is an output of the majority circuit and 70 a cut-off circuit responsive to the output of the majority circuit and the cut-off signal 10 to provide an output to the transistors 2—1, 2—2, 2—3, 2—4, 2—5 and 2—6.

An operation of this embodiment in a normal mode in which there is no cut-off signal 10 provided is the same as that described previously with reference to FIGS. 1 to 7 since the majority circuit 12 and the cut-off circuit 70 supply the output of the short-circuit preventing circuit 11 to the transistors 2—1, 2—2, 2—3, 2—4, 2—5 and 2—6 as base signals therefor as it is.

In an operation during an overcurrent, when the cut-off signal 10 is provided, the majority circuit 12 performs a majority operation for the base signals (on signals) to the transistors 2—1, 2—3 and 2—5 of upper arms and the base signals (on signals) to the transistors 2—2, 2—4 and 2—6 of lower arms. Table 2 shows majority signals 13 which are results of majority in modes 1 to 6 corresponding to those in Table 1. "1" in a column of transistors corresponds to a state in which the base signal (on signals) are provided, "0" in the same column a state in which there is no base signal, "1" in a majority signal column the transistors of the upper arm being majority and "0" in the same column the transistors of the lower arms being majority. The majority signal 13 is latched by the cut-off signal 10.

TABLE 2

| transistors | upper arm transistors | | | lower arm signal | | | |
|---|---|---|---|---|---|---|---|
| phase transistor | U 2-1 | V 2-3 | W 2-5 | U 2-4 | V 2-6 | W 2-2 | majority |
| mode 1 | 0 | 0 | 1 | 1 | 1 | 0 | 0 |
| mode 2 | 0 | 1 | 0 | 1 | 0 | 1 | 0 |
| mode 3 | 0 | 1 | 1 | 1 | 0 | 0 | 1 |
| mode 4 | 1 | 0 | 0 | 0 | 1 | 1 | 0 |
| mode 5 | 1 | 0 | 1 | 0 | 1 | 0 | 1 |
| mode 6 | 1 | 1 | 0 | 0 | 0 | 1 | 1 |

Figure 9:
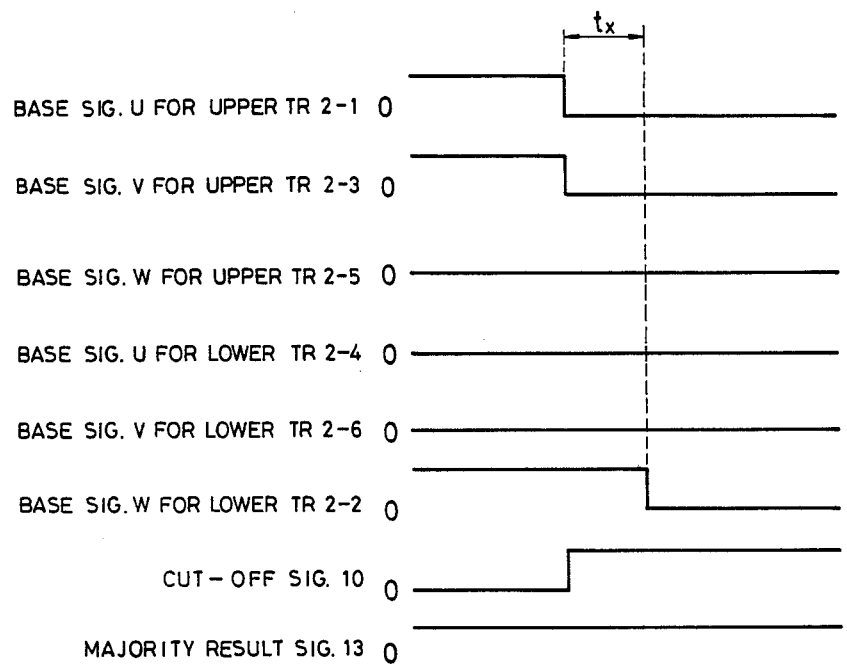
FIG. 9 is a time chart at a cut-off time of the circuit shown in FIG. 8.

When the cut-off signal 10 is provided upon an occurence of output short-circuit, the cut-off circuit 70 cuts the base signals to the transistors 2—1 to 2—6 off in sequence to be described, according to the majority signal 13 and the cut-off signal 10. When the majority signal 13 is "1", the base signals (on signals) to the upper arm transistors are shifted from 1 to 0, i.e., cut-off and, at a certain time tx thereafter, the base signals (on signals) to the lower transistors are shifted from 1 to 0. When the majority signal 13 is "0", the base signals (on signals) to the lower arm transistors are shifted from 1 to 0 and, at the time tx thereafter, the base signals (on signals) to the upper arm transistors are shifted from 1 to 0. FIG. 9 shows a time chart of base signal cut-off for the respective transistors when the cut-off signal 10 is provided in the mode 6, as an example.

Figure 1:
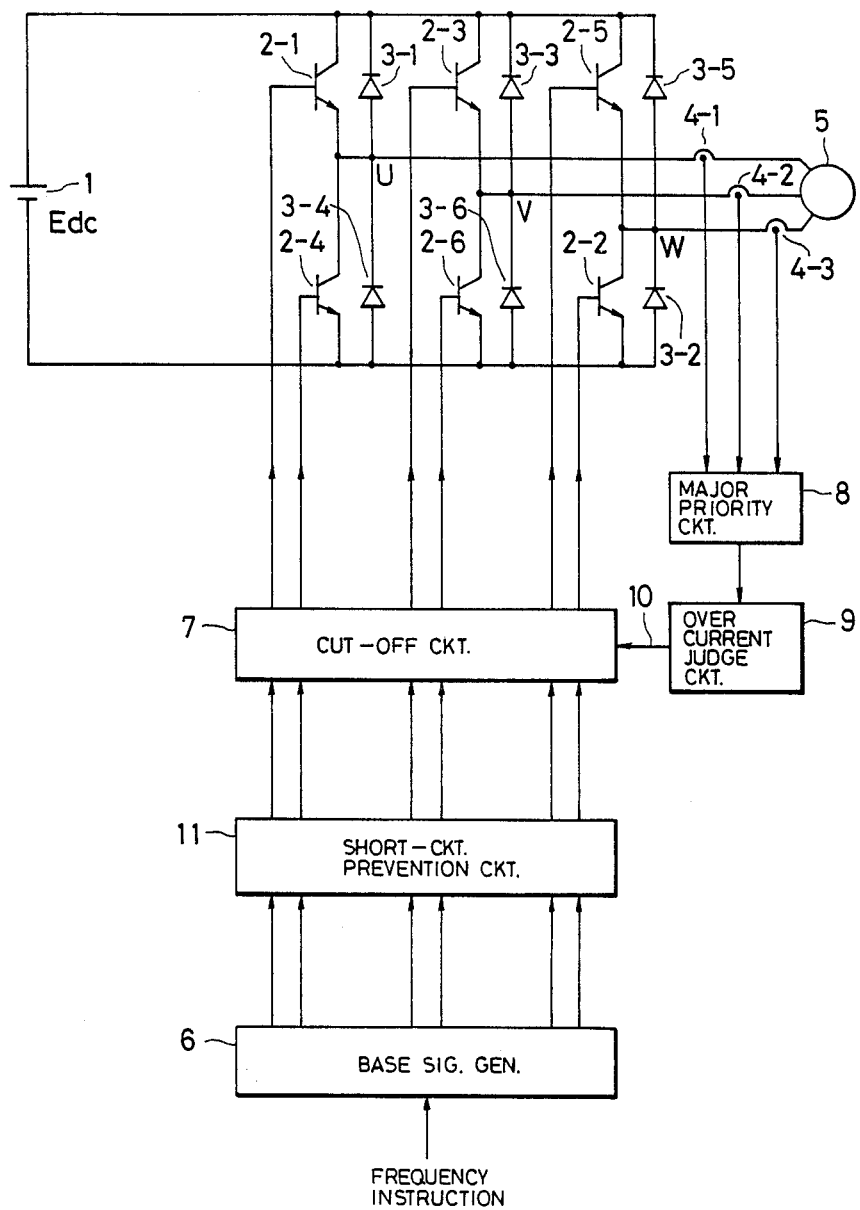
FIG. 1 is a circuit diagram of a conventional overcurrent protection circuit for an inverter device.
Figure 2:
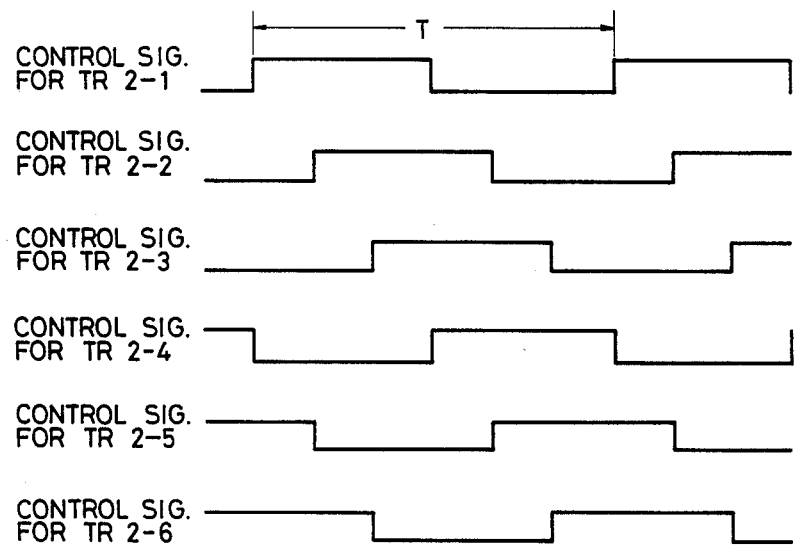
FIG. 2 shows waveforms of control signals for respective transistors, which are outputs of a base signal generator 6 in FIG. 1.
Figure 3:
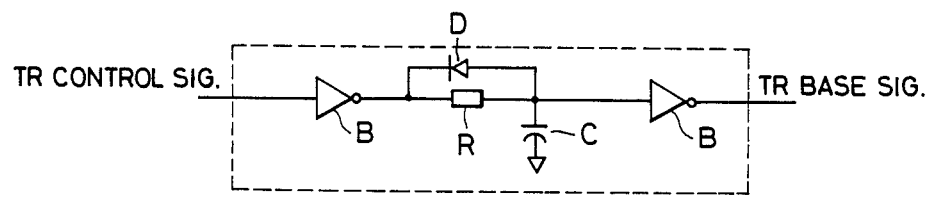
FIG. 3 is a circuit diagram of one component of a short-circuit preventing circuit.
Figure 4:
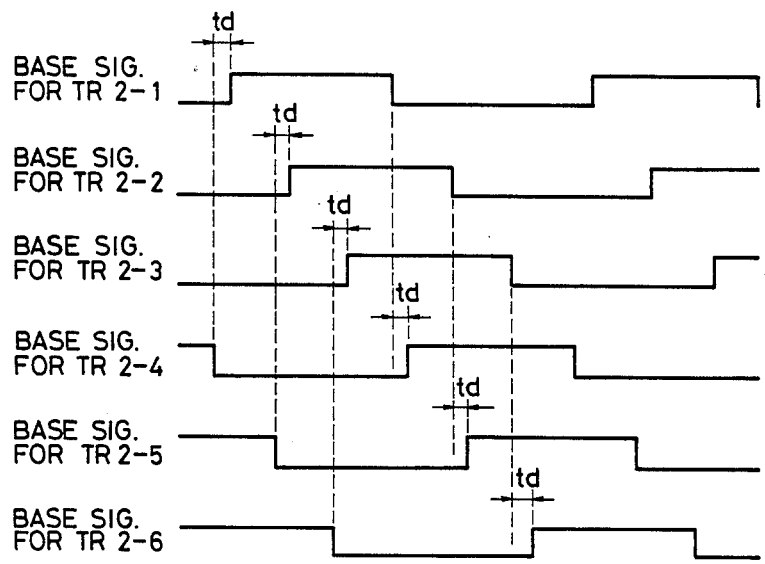
FIG. 4 shows base signals for the respective transistors, which are outputs of the short-circuit preventing circuit.
Figure 6:
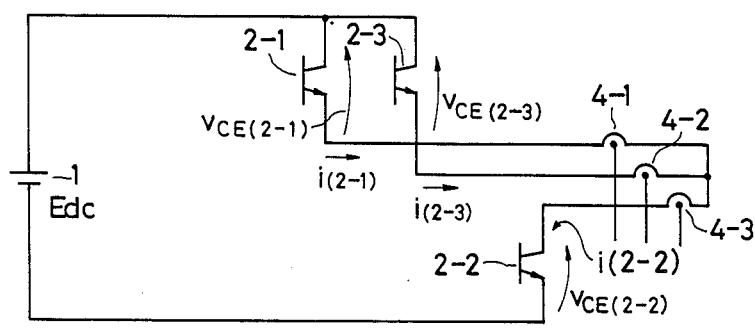
FIG. 6 shows an output short-circuit in a mode 6.
Figure 5:
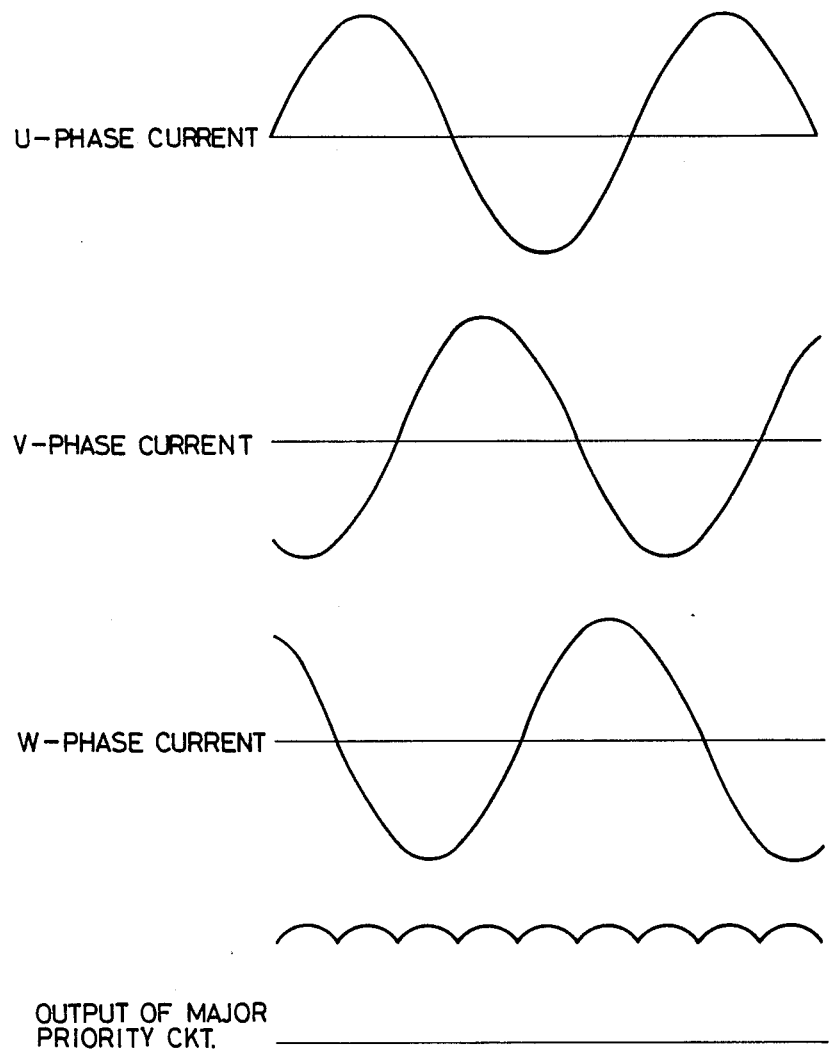
FIG. 5 is an explanatory figure of an operation of a major priority circuit 8.
Figure 10:
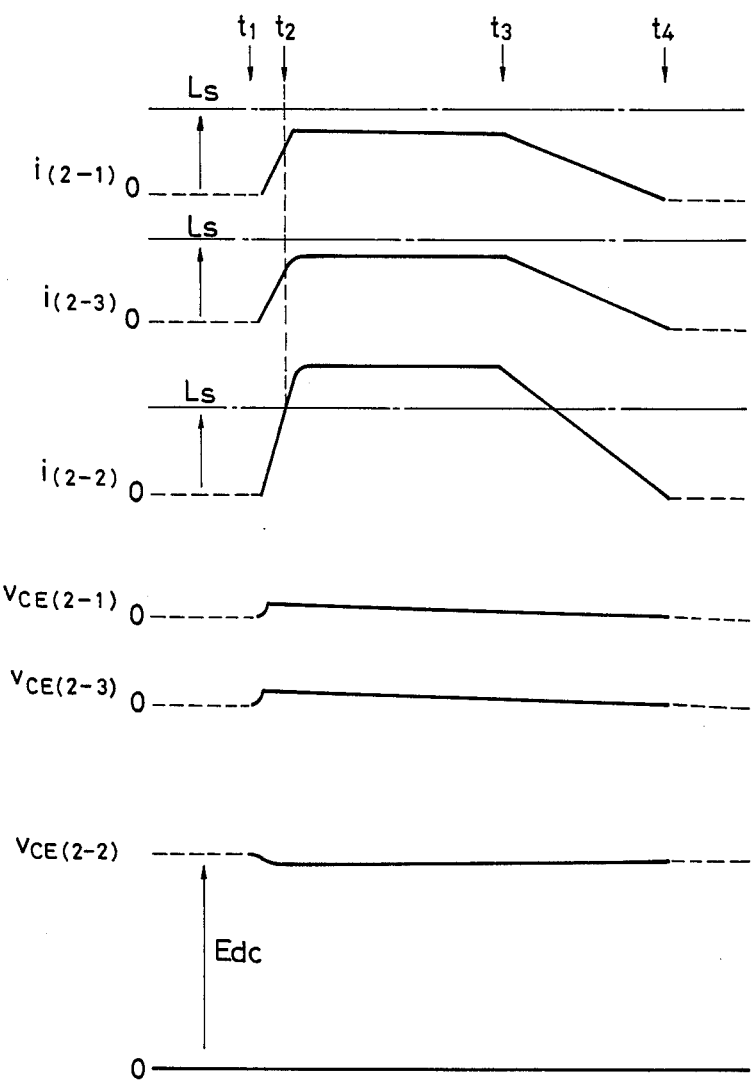
FIG. 10 shows collector currents and collector-emitter voltages of the respective transistors in FIG. 8 during the output short-circuit.

FIG. 10 shows collector currents and collector-emitter voltages of the respective transistors at an occurrence of short-circuit in the mode 6, and reference should be made to FIG. 6. When a short-circuit occurs at the time t1, the collector currents of the respective transistors increase abruptly due to lowering of output impedances thereof. Although the current i(2—2) exceeds an overcurrent judging level Ls at a time t2, the cut-off signal 10 is provided at a time t3 due to response delays and the cut-off operations are performed in the cut-off sequence as described with reference to FIG. 9. That is, the transistors 2—1 and 2—3 which have small collector currents and are nearly saturated are cut-off firstly. However, since such small current is cut-off at a very low rate, in other words, since the cut-off is performed at a lower rate than the conventional cut-off of the transistor which is turned on by itself and operating in the active region because of the nearly saturated condition, there is almost no surge voltage and thus the stress on the transistor which is turned on by itself becomes very small compared with the conventional circuit, if the snubber circuit is appropriately selected.

Although, in the described embodiment, the transistors are used as the electric gates, they may be other gates such as FETs.

Further, although, in the described embodiment, the so-called 180 degree conduction type (six steps) control signal (base signal) is used for the gate control of the inverter as an example, other control signal systems such as sinusoidal PWM etc. can be used with similar effects.

In the described embodiment, there may be a possibility of switching of the base signal at the cut-off operation because there is no latch of output of the base signal generator 6. In order to avoid this possibility, it is possible to supply the cut-off signal to either the base signal generator 6 or the short-circuit preventing circuit 11 as shown by a dotted line in FIG. 8 upon which the output condition of the base signal is latched.

According to the first embodiment of the present invention, the on signals of the gates which are decided as majority by the majority circuit in the overcurrent protecting operation are assigned as off signals and, at a certain time thereafter, the on signals of the gates which are decided as minority are assigned as off signals. Therefore, the stress on the transistor which is turned on by itself when the gates are turned off by the operation of the overcurrent protecting circuit is remarkably reduced and it is possible to use a compact snubber, resulting in a compact and inexpensive device. Further, since the durability of the gate against turning-off thereof can be made smaller, a further reduction of manufacturing cost thereof can be achieved.

Figure 11:
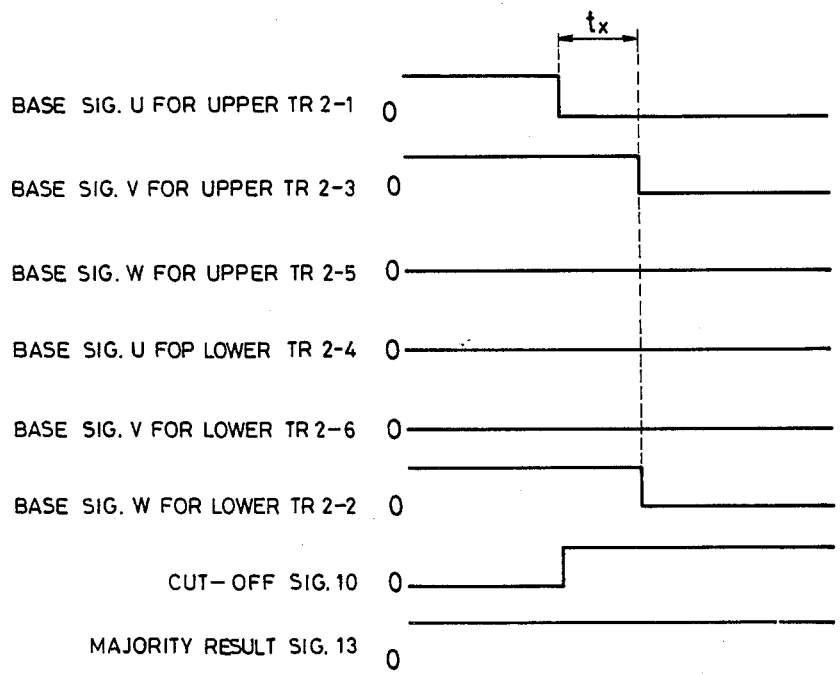
FIG. 11 is a time chart at a cut-off time of a second embodiment which can be shown by FIG. 8.

A second embodiment of the present invention has the same construction as that shown in FIG. 8 except for the structure of the majority circuit 12 and the cut-off circuit 70, and operates in the same manner as that of the first embodiment except that only one of two upper transistors having base signal "1" is shifted from 1 to 0 when the majority signal 13 is "1" and, at a certain time tx thereafter, the remaining one upper transistor having "1" and the lower transistors having "1" are shifted from 1 to 0. This is shown in FIG. 11. When the majority signal 13 is 0, one of two lower transistors having base signal 1 is shifted from 1 to 0 and, at the certain time tx thereafter, the remaining one lower transistor having base signal 1 and the upper transistors having base signal 1 is shifted from 1 to 0.

That is, in the overcurrent operation of the second embodiment, which is started upon the cut-off signal 10 from the overcurrent judging circuit 9, the majority circuit 12 performs a majority of base signals (on signals) to the transistors of the upper arms and base signals (on signals) to the transistors of the lower arms. A result of this majority decision is the same as that shown in Table 2 and the result signal 13 is latched by the cut-off signal 10 as in the previous embodiment. This will be described with reference to Table 2.

The cut-off circuit 7 responds to the majority decision signal 13 and the cut-off signal 10 and operates such that, when the majority signal 13 is "1", one of two transistors of the upper arms, whose base signal are "1", is shifted from "1" to "0" and, at a time tx thereafter, the remaining upper transistor having base signal "1" and the lower transistor having base signal "1" are shifted from "1" to "0" and, when the majority decision signal 13 is "0", one of the two transistors of the lower arms which have base signals "1" is shifted to "0" and, at the time tx thereafter, the remaining lower transistors having base signal "1" and the upper transistors having base signal "1" are shifted to "0", as shown in FIG. 11.

Figure 12:
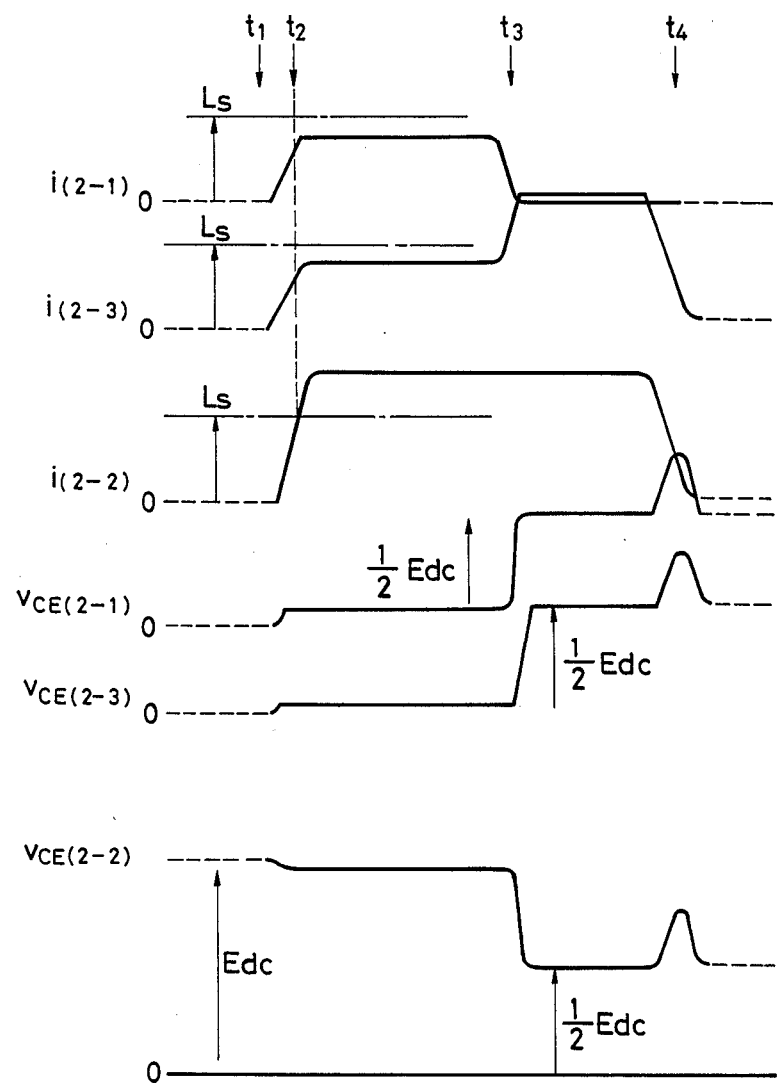
FIG. 12 shows collector currents and collector-emitter voltages of the respective transistors of the circuit in FIG. 11 when the output short-circuit occurs.

FIG. 12 shows collector currents and collector-emitter voltages of the respective transistors when a short-circuit occurs, in the mode 6. In FIG. 12, when the short-circuit occurs at a time t1, the collector currents of the respective transistors increase abruptly due to the decreased output impedances thereof. The cut-off signal 10 is provided at a time t3 due to the previously mentioned response delays although the collector currents exceed the overcurrent judging level Ls at the time t2, resulting in the cut-off sequence shown in FIG. 11. Since, therefore, the transistor 2—1 is firstly cut-off and only the transistors 2—3 and 2—2 become on after the time t3, the collector-emitter circuits of the transistors 2—3 and 2—2 owe a voltage of about ½ Edc, respectively. Therefore, when the transistors 2—3 and 2—1 are cut-off at a time t4, the stress on the transistor 2—2 is reduced remarkably, compared with the conventional circuit.

The use of other gates than transistors, other control signal systems then the 180 degree conduction type and the avoidance of the undesirable switching of the base signal due to the lack of output latching of the base signal generator can be realized in the same manner as those mentioned with respect to the first embodiment with similar effects.

Figure 13:
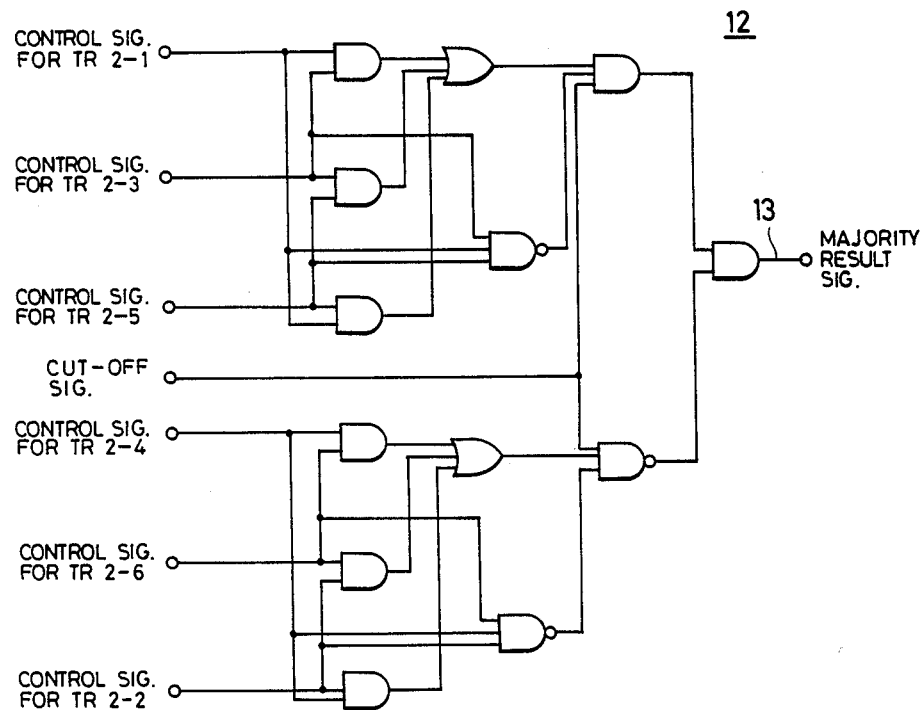
FIG. 13 is an example of a circuit diagram of a majority circuit.

FIG. 13 shows a circuit diagram of an example of the majority circuit 12 to be used in the first embodiment. The majority circuit 12 in FIG. 13 is composed of a plurality of AND gates and a plurality of OR gates by which the binary logic shown in Table 2 is constituted in a simplified structure. That is, in this circuit example, each transistor is turned on when its control signal is "1" (H level) and turned off when its control signal is "0" (L level). The majority signal 13 is "1" (H level) when two of the upper transistors 2—1, 2—3 and 2—5 are on and is "0" (L level) when two of the lower transistors 2—2, 2—4 and 2—6 are on, as shown in Table 2.

Figure 14:
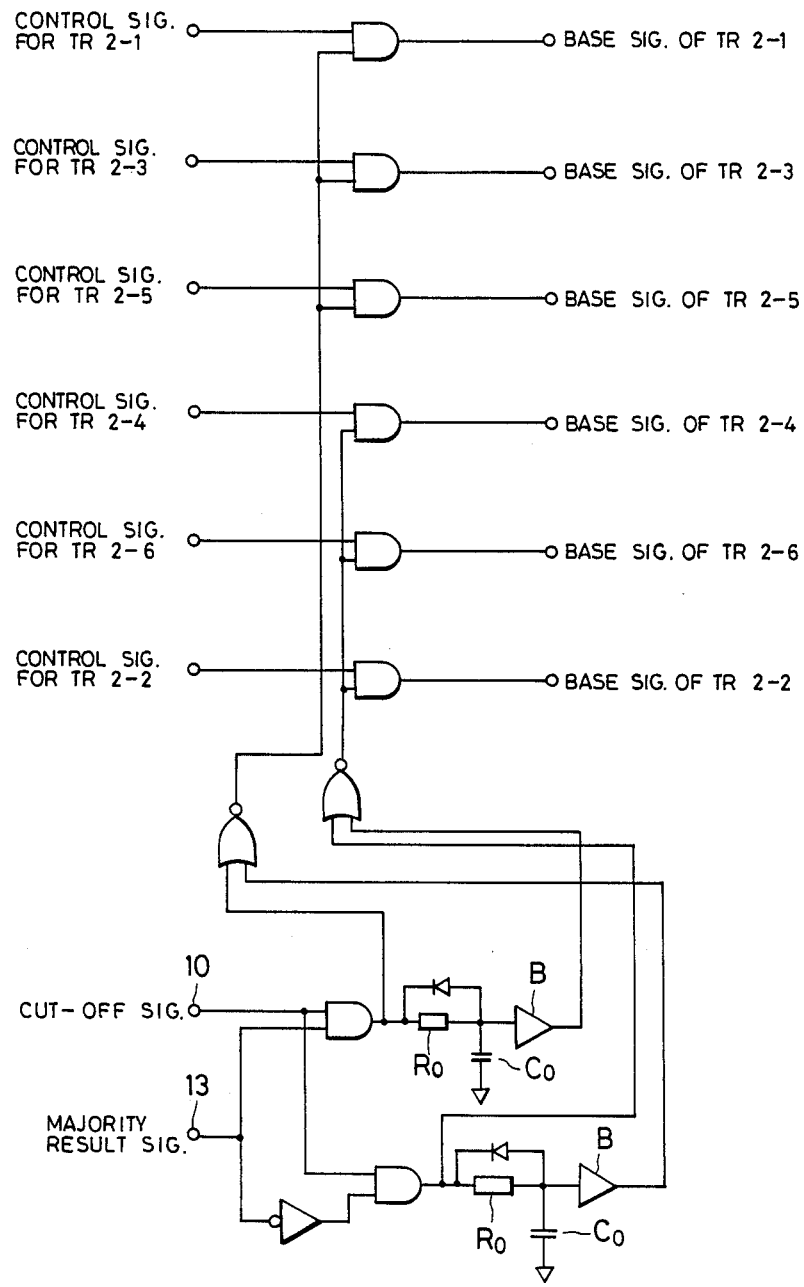
FIG. 14 is an example of a circuit diagram of the cut-off circuit 70.

FIG. 14 shows a circuit diagram of an example of the cut-off circuit 70 to be used in the first embodiment, which is constituted with AND gates, NOR gates, timer circuits each including a resister Ro and a capacitor Co for providing the time tx and buffers B for wave-shaping outputs of the timer circuits, so that the binary logic timer chart shown in FIG. 9 can be obtained.

Figure 15:
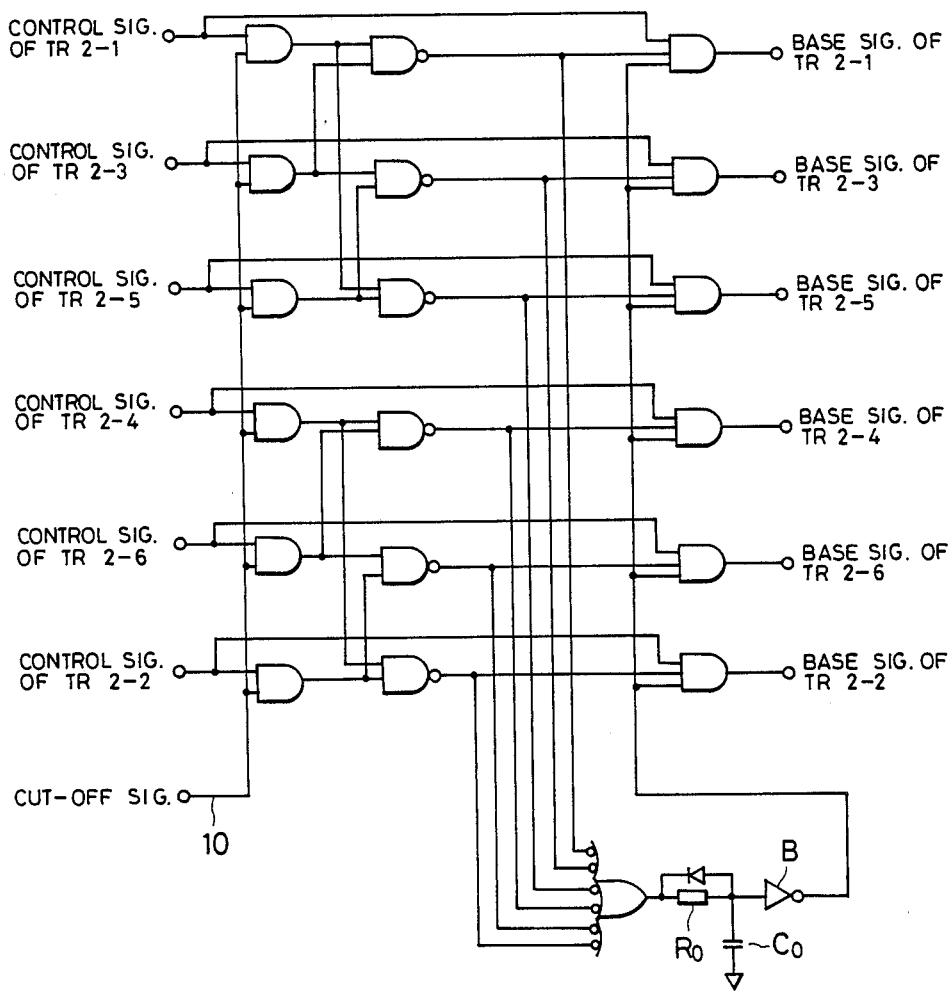
FIG. 15 is an example of a circuit diagram of a combined majority circuit and cut-off circuit.

FIG. 15 shows a circuit diagram which is a combination of the majority circuit 12 and the cut-off circuit 70 in the first embodiment.

These circuits in FIGS. 13, 14 and 15 can be easily modified by those skilled in the art so that the operation of the second embodiment is realized. Further, it may be easy to constitute these circuits in other forms than those shown in these figures.

I claim:

1. An overcurrent protection circuit for an inverter device including three arms each composed of a pair of series connected electric gates, a junction between each of said pair of gates being connected to a load and opposite ends being connected across a d.c. power source for supplying a three-phase a.c. power to the load by on-off controlling the electric gates sequentially according to on-off signals supplied from a control circuit to the electric gates, said overcurrent protection circuit comprising:

current detecting means for monitoring current flowing through the electric gates;

an overcurrent detection circuit, responsive to an output of said current detecting means, for providing an overcurrent signal when the current flowing through any of the electric gates exceeds a predetermined level; and a majority circuit, responsive to an output of said overcurrent detection circuit, for detecting whether a majority of the electric gates on one side or another side of each of the arms are turned on, wherein, when the overcurrent signal is produced, one of the on signals of the electric gates on either side of the arms, which are judged as majority, is turned off at a first time point and, at a predetermined time thereafter, the on signals of the remaining electric gates are turned off.

2. The overcurrent protection circuit as claimed in claim 1, wherein said majority circuit is latched in response to said overcurrent signal.

3. The overcurrent protection circuit as claimed in claim 1, wherein the on-off signals of the electric gates supplied from said control circuit are latched in response to said overcurrent signal.

4. An overcurrent protection circuit for an inverter device including three arms each composed of a pair of series connected electric gates, a junction between each of said pair of gates being connected to a load and opposite ends being connected across a d.c. power source, for supplying a three-phase a.c. power to the load by on-off controlling the electric gates sequentially according to on-off signals of the electric gates supplied thereto from a control circuit, said overcurrent protection circuit comprising:

current detecting means for monitoring current flowing through the electric gates;

an overcurrent detection circuit, responsive to an output of said current detecting means, for providing an overcurrent signal when the current flowing through any of the electric gates exceeds a predetermined current level; and a majority circuit, responsive to an output of said overcurrent detection circuit, for detecting a majority of on signals of the electric gates on one side or another side of each of the arms, wherein the electric gate which receives the highest stress in turning off the electric gates in order to release the electric gates from the overcurrent is detected by said majority circuit when the overcurrent occurs, said majority circuit controlling a sequence of off control of the electric gates to reduce the stress on the detected electric gate and protect the electric gates against the stress.

5. An overcurrent protection circuit for an inverter device including three arms each composed of a pair of series connected electric gates, one of said gates being an upper gate and one of said gates being a lower gate, a junction between each of said pair of gates being connected to a load and opposite ends being connected across a d.c. power source for supplying a three-phase a.c. power to the load by on-off controlling the electric gates sequentially according to on-off signals supplied from a control circuit to the electric gates, said overcurrent protection circuit comprising:

current detecting means for monitoring currents flowing through the electric gates;

an overcurrent detecting circuit, responsive to an output of said current detecting means, for providing an overcurrent signal when a current flowing through any of the electric gates exceeds a predetermined level;

a majority circuit, responsive to the on-off signals of the electric gates and to an output of said overcurrent detecting circuit, for detecting a majority of the on signals of three electric gates on one side of each of the arms, to determine whether a majority of said electric gates on each arm are turned on; and a cut-off circuit for turning off on signals of said electric gates in accordance with an output of said current overdetection circuit and said majority circuit;

wherein said cut-off circuit turns off the on signals of one of the electric gates on a side of the arms which has two of said electric gates turned on when an overcurrent occurs at a first time point, and wherein, at a predetermined time after said predetermined time point, said cut-off circuit turns off the on signals of one of the electric gates on a side of the arms which has one of said electric gates turned on.

6. The overcurrent protection circuit as claimed in claim 5, wherein said majority circuit operates upon an occurrence of overcurrent such that one on signal of one of the electric gates on the side of the arms which are judged as majority is shifted to off at said first time point and, at said predetermined time, another on signal of another of the electric gates on the sides of the arms which are judged thereby as majority and one on signal of one of the electric gate on the side at the arms which are judged as minority are shifted to off.

7. The overcurrent protection circuit as claimed in claim 5, wherein said said majority circuit is latched upon an occurrence of an overcurrent signal.

8. The overcurrent protection circuit as claimed in claim 5, wherein the on-off signals supplied from said control circuit to the electric gates are latched upon an occurrence of an overcurrent signal.

* * * * *